Patented June 5, 1951

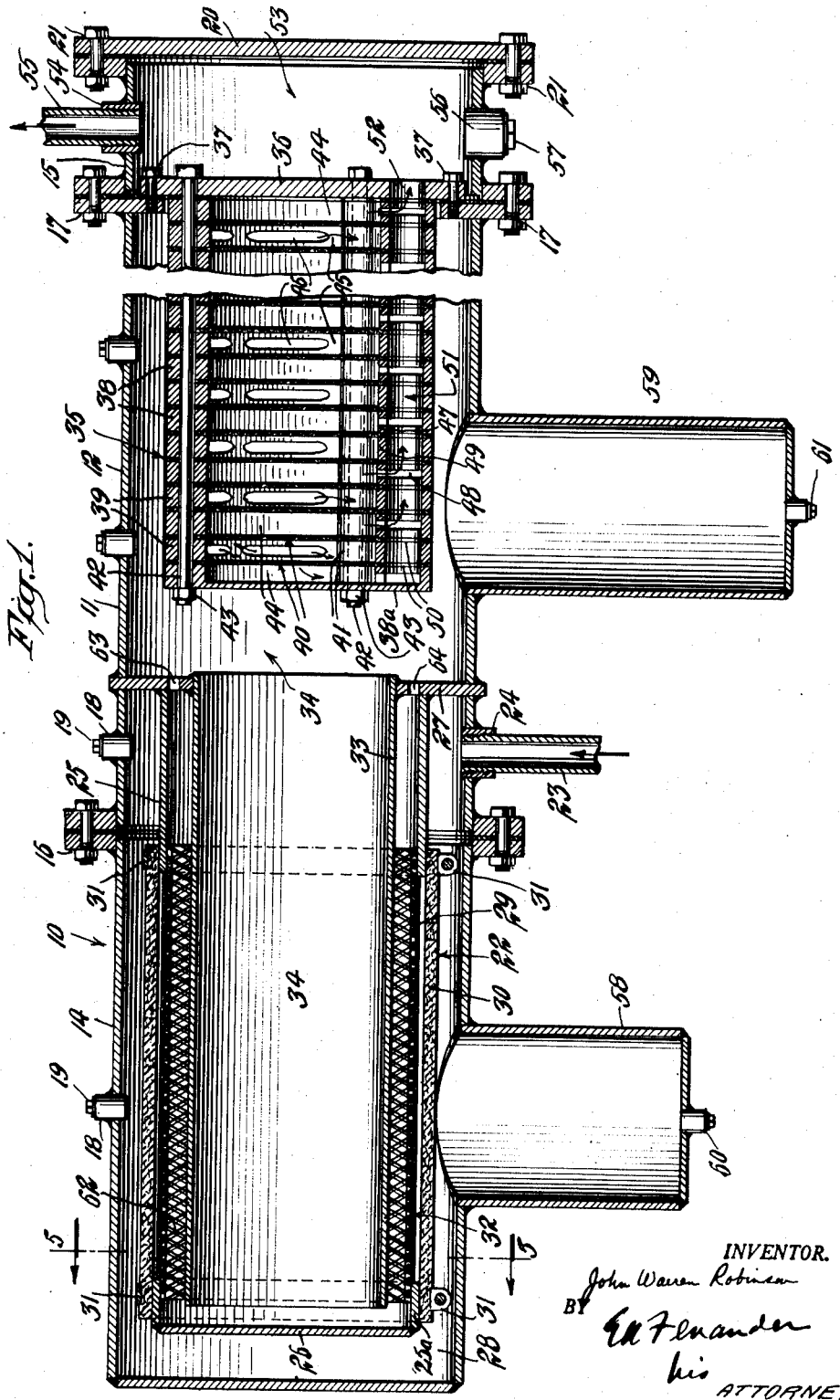

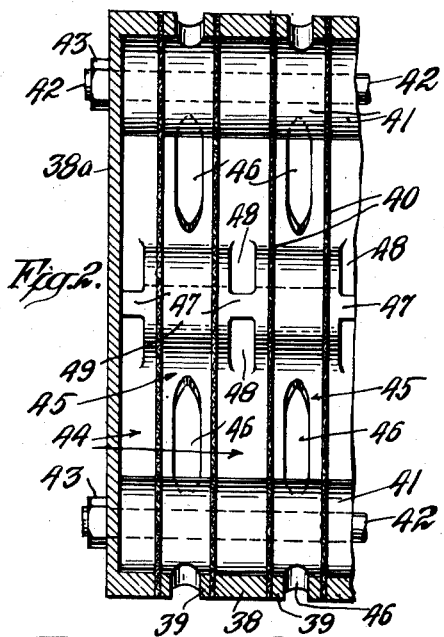
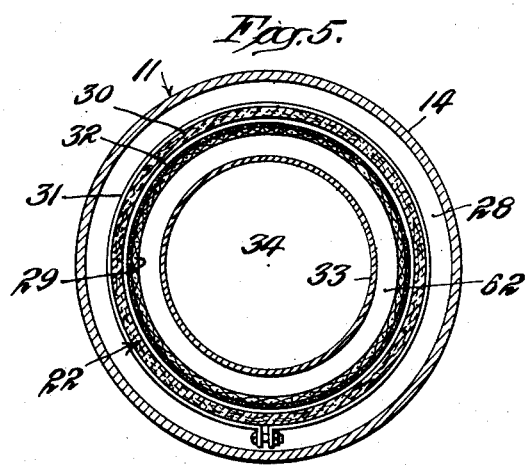
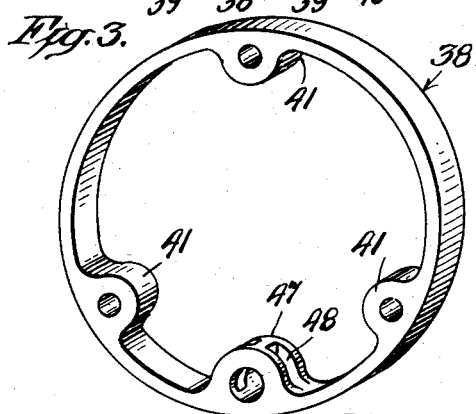
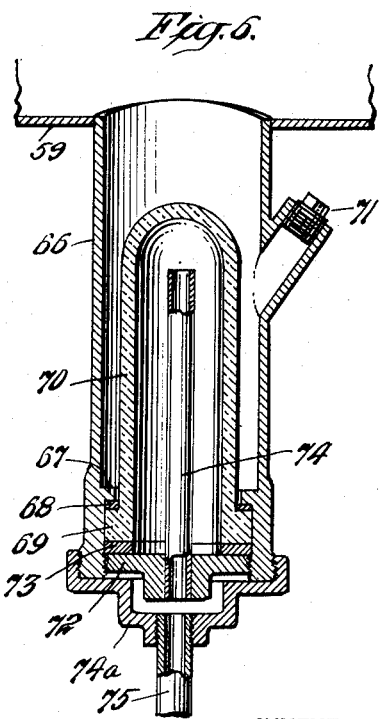
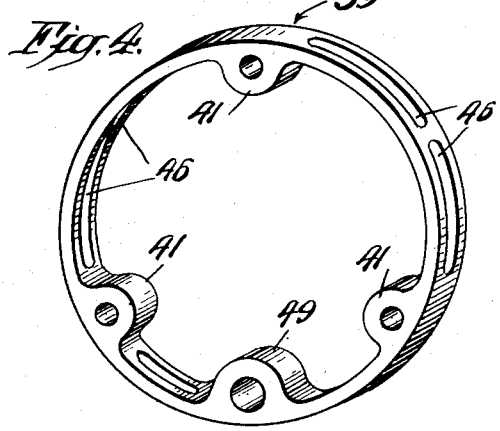

2,555,607

UNITED STATES PATENT OFFICE 2,555,607

SEPARATION OF IMMISCIBLE LIQUIDS

John Warren Robinson, Merchantville, N. J., assignor to Selas Corporation of America, Philadelphia, Pa., a corporation of Pennsylvania Application February 23, 1946, Serial No. 649,512

10 Claims. (Cl. 210—44)

My invention relates to phase separation of immiscible liquids, and is concerned with an improvement for effecting such phase separation rapidly and efficiently without the aid of centrifugal apparatus.

In many instances it is necessary to separate from a body of liquid forming a continuous phase particles of another liquid forming a dispersed phase, such liquid particles being distributed in the body of liquid forming the continuous phase and immiscible therewith. It has already been proposed to effect phase separation of such immiscible liquids with the aid of a porous wall member which is formed with capillary passages and pervious to the liquid forming the continuous phase. When phase separation is effected in this manner the pressure differential produced across such porous wall member is dependent, among other things, upon the interfacial tension between the liquids to be separated. While the liquid forming the continuous phase is flowing through the porous wall member which is pervious to such liquid, the liquid particles of the dispersed phase are prevented from flowing through the capillary passages thereof by the interfacial tension between the liquids at the inlets of the capillary passages.

It is an object of my invention to provide an improvement for separating immiscible liquids with the aid of porous wall members of this type, particularly to present to the mixture of liquids to be separated a maximum overall area of capillary wall surfaces which occupies a minimum amount of space. More particularly, it is an object to embody such a large area of capillary wall surface in a single element or member which is easily and readily removable for cleaning and replacement. I preferably accomplish this in such a way that the separating unit in which the porous member or members are embodied may be removed from and reinserted in position without disturbing the connections to the device or apparatus.

In many instances it is necessary to separate a dispersed phase, such as water, for example, from an emulsion in which fine particles of the dispersed phase are distributed in a body of liquid forming the continuous phase, such as oil, for example. While separation of such immiscible liquids can be effected with the aid of porous members of the type just described, the fact that the porous members must effect all of the coalescing and agglomerating action of the dispersed material, in addition to separating such material from the liquid forming the continuous phase, imposes an unduly heavy task upon the porous members. This is so because the slugs or droplets of the dispersed liquid, which coalesce and form only on the surfaces of the porous members, tends to reduce the overall effective surface area of the porous members at which simple phase separation of the immiscible liquids is ordinarily accomplished. The work imposed upon the porous members to effect phase separation of the dispersed material in an emulsion is also made especially difficult when foreign solid matter is present and exercises a stabilizing action on the emulsion. In such cases, the emulsion is usually referred to as being "dirt stabilized" and exceedingly difficult to cause coalescing of the dispersed material and break up the emulsion.

It is a further object of the invention to improve the operation of liquid separating units of this type for separating the dispersed phase of an emulsion. This is accomplished by providing a filtering unit which cooperates and works with the separating unit by first agglomerating or coalescing a substantial fraction of the dispersed material before the mixture of liquids contacts the porous member or members of the separating unit. The final or residual coalescing of the dispersed phase can be readily accomplished at the surfaces of the porous member or members of the separating unit without unduly impairing the efficiency of such porous members in effecting phase separation of the immiscible liquids. Such initial filtering of the emulsion is preferably accomplished with the aid of a mat formed of mineral fibers, such as glass, for example, which are loosely packed to provide a filtering and coalescing element having the appearance of a felt-like pad and formed with capillary passages. It has been found that such a filtering element is highly effective in promoting the coalescing or agglomerating action of the dispersed material, particularly when an emulsion is "dirt stabilized" and ordinarily difficult to break up. To promote the coalescing action, the fibers of the filtering element must be wettable by the particles of liquid forming the dispersed phase when such particles are in the presence of the liquid forming the continuous phase. A filtering element of this kind has been found highly effective for removing foreign solids from emulsions, thereby rendering the emulsions less stabilized which in turn promotes the coalescing action that takes place during passage of the emulsion through the capillary passages of the element.

It is a still further object of the invention to provide a filtering and coalescing unit ahead of a liquid separating unit in such a manner that a patch of flow for the liquid is provided between these units in which separation of the coalesced droplets or bodies of the dispersed material is accomplished by difference of specific gravity, whereby a substantial fraction of the dispersed material may be removed from the mixture of immiscible liquids to reduce the amount of coalescing work imposed upon the porous wall members of the liquid separating unit and speed up the separation of the immiscible liquids. This is preferably accomplished by constructing the filtering unit in such a way that the path of flow for the mixture in which separation of the dispersed material takes place by difference in specific gravity is practically no greater in length than the filtering and coalescing unit itself, thereby providing a combined coalescing unit and liquid separating unit which is compact and relatively small in size and requires a minimum amount of space in use.

The novel features which I believe to be characteristic of my invention are set forth with particularly in the claims. The invention, both as to organization and method, together with the above and further objects and advantages thereof, will be better understood by reference to the following description taken in connection with the accompanying drawings forming a part of this specification, and of which:

Fig. 1 is a vertical sectional view of apparatus embodying the invention including a liquid separating unit and a liquid filtering and coalescing unit;

Fig. 2 is a fragmentary enlarged horizontal sectional view of the liquid separating unit of Fig. 1;

Figs. 3 and 4 are perspective views of parts of the apparatus shown in Figs. 1 and 2 to illustrate details of the liquid separating unit;

Fig. 5 is a sectional view, taken on line 5—5 of Fig. 1, to illustrate the filtering unit more clearly; and Fig. 6 is a fragmentary vertical sectional view illustrating a modification of the apparatus shown in Fig. 1.

In Fig. 1 is illustrated apparatus 10 embodying the invention comprising an outer shell 11 including a central section 12 and end sections 14 and 15 removably connected thereto at 16 and 17, respectively. The central section 12 and end section 14 are formed with vent openings 18 having removable closure members 19 for a purpose which will be described hereinafter. The end section 14 is cup-shaped and forms an end cover for one end of the shell 11, while the opposite end section 15 is provided with an end plate 20 which is removably secured thereto at 21.

Within the end section 14 and also a part of the central section 12 of the casing 11 is provided a filtering and coalescing unit 22 for removing foreign solids and effecting a coalescing or agglomerating action of the dispersed phase of an emulsion adapted to be supplied under pressure to the apparatus 10 through a conduit 23 connected to an inlet 24. The filtering and coalescing unit 22 comprises an elongated hollow member composed of a pair of tubular sleeves 25 and 25a that are joined together by a perforated tube or cylinder 29 which may be formed of expanded metal. It will be seen that sleeve 25 is fastened to flange 27 as by welding. Cylinder 29 is fastened to both sleeve 25 and sleeve 25a and sleeve 25a is closed on its left end by a cap 26. These parts provide a rigid, unitary member. The hollow member cooperates with the outer shell to form a space 28 around its exterior which may be referred to as an inlet space.

A body of porous material is disposed about and completely envelops the perforate section 29 of the hollow member. As shown, the porous material comprises a mat 30 of loosely packed fibers formed as an open-ended sleeve which may be slipped into position over the closed end 26 of the hollow member, so as to overlie the perforate section 29. Such a mat 30 may be formed of mineral fibers, such as glass or the like, for example, which are loosely packed to provide a porous element having capillary passages therein. The mat 30 is of greater length than the perforate section 29 so that the ends thereof may be tightly fixed in position by suitable removable clamping rings 31 which act against the sleeves 25 and 25a. In order to protect the underside of the mat 30 from the perforate section 29, fine mesh screening 32 may be wrapped about the perforate section against which the mat 30 is adapted to bear.

Within the hollow member and spaced therefrom is a hollow open-ended sleeve 33 having one open end closely adjacent to and spaced from the closed end 26 of the hollow member. The opposite open end of the sleeve 33 is secured to the inner peripheral edge of the flange 27, thereby supporting the sleeve 33 in a cantilever fashion in the same manner that the hollow member 25 is supported, as previously described.

The open end of the sleeve 33 at the flange 27 communicates with the interior of the central section 12 of the shell 11. Essentially, the hollow sleeve 33 and the interior of the central section 12 together form a chamber 34 which is separated from the inlet space 28 by a partition including the porous mat 30. Within the enlarged end of chamber 34 formed by the central section 12 of the shell is provided a liquid separating unit 35.

The liquid separating unit 35 at one end is provided with an enlarged end plate 36 which is secured at its outer peripheral edge portion, as by bolts 37, for example, to the flanged end of the central section 12 of the shell. The unit 35, which is supported in a cantilever fashion at one end at the end plate 36, comprises two groups of annular-shaped spacer elements or rings 38 and 39 which are shown most clearly in Figs. 3 and 4. The spacer elements 38 and 39 are alternately stacked in end to end relation, a sheet 40 of porous material being disposed between each pair of adjacent elements 38 and 39. The end spacer element 38a nearest to the sleeve 33 is generally like the other elements 38 and differs therefrom by having a wall at one face thereof to form a solid end plate for the separating unit 35.

The spacer elements 38 and 39, including the end element 38a, are formed with three inwardly extending apertured bosses 41 which are distributed about the periphery of each element. The apertured bosses 41 of the spacer elements 38, 38a and 39 are in alignment and, together with similarly distributed apertures in the porous sheets 40, form elongated openings through which extend tie-bolts 42 threaded at opposite ends to receive tightening nuts 43. The end plate 36 is also formed with three spaced apart apertures which are in alignment with the apertured bosses 41 and through which the tie-bolts 42 extend at one end to receive one set of the tightening nuts 43.

The two groups of spacer elements 38 and 39 and sheets 40 of porous material therebetween form a row of compartments 44 and 45, each compartment 45 being disposed between adjacent compartments 44. Each compartment 44, except the end compartment, is defined by a spacer element or ring 38 and the porous sheets 40 held against the opposing faces thereof. One end compartment 44 is defined by the end spacer element 38a and the porous sheet 40 held against the inner face thereof, and the opposite end compartment 44 is defined by an end spacer element 38 and the end plate 36 and porous sheet 40 held against the opposing faces thereof. Each compartment 45 is defined by a spacer element 39 and the porous sheets 40 held against the opposing faces thereof.

The compartments 45 may be referred to as inlet compartments of the liquid separating unit into which the mixture of immiscible liquids is adapted to pass from chamber 34 through suitable inlets or elongated slots 46 formed in end to end relation about the circumference of each spacer element 39. As will be explained presently, the porous sheets 40 are pervious only to one of the liquids in the mixture passing into the compartments 45, and the liquid to which the porous sheets are pervious flows therethrough into the compartments 44. The spacer elements 38 defining the compartments 44 are formed with inwardly extending apertured bosses 47 which are recessed or slotted at 48 intermediate the outer faces thereof, as best shown in Fig. 3, so that the liquid flowing into the compartments 44 can pass through the slots 48 into the apertures formed in the bosses 47.

The apertured bosses 47 of the spacer elements 38 are in alignment with and contiguous to inwardly extending apertured bosses 49 formed on the spacer elements 39 defining the compartments 45; and the porous sheets 40 are provided with openings 50 at the regions of the apertured bosses 47 and 49, so as to form a manifold 51 at the bottom part of the liquid separating unit 35 which extends from the end spacer element 38a through an opening 52 in the end plate 36.

The separated liquid in the compartments 44 can only pass through the slots 48 of spacer elements 38 into the apertures in bosses 47 which formed a part of the manifold 51. Since the apertures in bosses 49 of the spacer elements 39 extend from one face to the opposite face of each such element, as shown in Fig. 4, the separated liquid flowing in the manifold 51 is kept out of physical contact with the mixture of liquids in the compartments 45 which are defined by the spacer elements 39.

Essentially, the liquid separating unit 35 just described serves as a porous wall member for the chamber 34 through which one liquid can pass while another liquid immiscible therewith is held back. The liquid which passes through such wall member is discharged through the manifold 51 into an end chamber 53 formed by the end section 15 of the shell 11. The liquid in chamber 53 is discharged from the apparatus 10 through an outlet 54 to which is connected a discharge conduit 55. A second outlet 56 having a removable closure member 57 is provided for the chamber 53 diametrically opposite the outlet 54 for a purpose which will be described presently.

The shell 11 is provided with two downwardly depending vessels 58 and 59, one of which opens into the inlet space 28 and the other of which opens into the chamber 34 at the region of the liquid separating unit 35 just described. The liquid which is held back by the apparatus 10 collects in the vessels 58 and 59, as will be described presently, and removable drain plugs 60 and 61 are provided for these vessels to remove from time to time the liquid collecting therein.

When the apparatus 10 just described is employed to separate a dispersed phase from an emulsion in which fine particles of a liquid forming such dispersed phase are distributed in a liquid forming a continuous phase, the mixture of immiscible liquids forming such emulsion is supplied under pressure through the conduit 24 to the inlet space 28. After the apparatus has been in operation for a period of time, the inlet space 28 and vessel 58 communicating therewith are entirely filled with the mixture of immiscible liquids introduced therein. To permit air trapped in the inlet space to be vented therefrom, the closure member 19 may be temporarily removed from the vent opening 18 in the end section 14, so that the hollow member 25 will be completely enveloped by the mixture.

The mixture forming the emulsion is introduced into the inlet space 28 under sufficient pressure to cause the mixture to pass through the capillary passages of the mat 30 into the annular space 62 formed between the hollow member 25 and sleeve 33. The mat 30 is formed of material possessing such physical properties that it is preferentially wetted by the liquid forming the dispersed phase when in the presence of the continuous phase.

Thus, when fine particles of water are dispersed in a hydrocarbon liquid forming the continuous phase of an emulsion, for example, the mat 30 is formed of a hydrophilic material which is preferentially water wetted in the presence of hydrocarbon liquid. In such case the fibrous mat 30 may be formed of a material, such as glass fibers and the like, or any other suitable hydrophilic material well known in the art. Conversely, when fine particles of a hydrocarbon liquid are dispersed in water or an aqueous solution forming the continuous phase of an emulsion, the mat 30 is rendered hydrophobic so that it is preferentially oil wetted in the presence of water. In such case the fibrous mat 30 may be formed of a material, such as glass fibers and the like, which has been treated in any suitable manner well known in the art to render the material hydrophobic or water repellant. For example, the material forming the mat 30 may be rendered hydrophobic by treating such material with silicones or with a composition comprising an organo-silicon halide, as disclosed in Patnode Patent No. 2,306,222.

During passage of the emulsion through the fibrous material forming the mat 30, the individual fibers become wetted by the fine particles of liquid forming the dispersed phase of the emulsion, inasmuch as the material of the mat is preferentially wetted by such dispersed phase. The fine particles of liquid forming the dispersed phase build up at the surfaces of the individual fibers, thereby coalescing and agglomerating the fine liquid particles into larger particles to form droplets or slugs of liquid which are mechanically disrupted or dislodged from the fibers and pass into the annular space 62.

I have found that a mat 30 formed of fibrous material, such as glass and the like for example, is particularly effective for coalescing or agglomerating the fine particles of liquid forming the dispersed phase of an emulsion, either when such material is untreated and inherently preferentially water wetted or when treated so as to be preferentially oil wetted. When the mat 30 is formed of loosely packed mineral fibers which are relatively long and of an average thickness of about one micron, a body of porous material is provided having capillary passages therein which not only is effective to coalesce or agglomerate the dispersed material but is highly efficient as a filtering medium to remove solid foreign matter from emulsions. Since foreign solids often tend to stabilize emulsions, the effective removal of foreign solid matter renders the emulsions less stabilized in this respect and promotes the coalescing action which takes place during passage of the emulsion through the capillary passages in the mat 30.

The initial coalescing or agglomerating action of the dispersed phase of the mixture is effected by the mat 30. The coalesced bodies of the dispersed material and liquid forming the continuous phase pass into the annular space 62 and completely fill such space after the apparatus 10 has been in operation for a period of time. To prevent trapping of air in the upper part of the annular space 62, a small vent opening 63 is provided in the flange 27 to permit trapped air to pass from the space 62 into the interior of the central section 12 of the shell 11.

The mixture in the annular space 62 flows toward the closed end 26 of the hollow member 25. The mixture then reverses its direction of movement and passes into the sleeve 33 and interior of the central section 12 of the shell. After the apparatus has been operated for a period of time the sleeve 33, the interior of central section 12 and vessel 59 communicating with the latter become filled with the mixture. When the apparatus 10 is initially placed in operation the removable closure members 19 for the vent openings 18 in the central section 12 may be removed sufficiently long to permit trapped air to escape from the interior of the central section 12, so that the mixture will completely envelop the separating unit 35 and fill the space in which it is disposed.

The sleeve 33 and interior of the central section 12, which together provide the chamber 34, form a horizontally extending path of flow for the mixture from the discharge side of mat 30 to the liquid separating unit 35. The mixture in chamber 34 passes through the inlets 46 of the liquid separating unit 35 into the inlet compartments 45 at which regions the mixture is brought into physical contact with the porous sheets 40.

In each instance, the sheets 40 employed are pervious to the liquid forming the continuous phase of the mixture and impervious to the liquid particles forming the dispersed phase. The liquid passing through the sheets 40 enters the compartments 44 and thence flows into the apertured bosses 47 of spacer elements 38 through the slots 48 formed in such bosses. The liquid forming the continuous phase then passes through the manifold 51 in the lower part of the separating unit 35 into the end chamber 53. From chamber 53 the liquid is discharged from the apparatus 10 through the outlet connection 55. By providing such outlet connection at the upper part of chamber 53, this chamber as well as the compartments 44 and manifold 51 will completely fill with the liquid forming the continuous phase of the mixture after the apparatus has been in operation for a period of time.

Although not to be limited thereto, the porous membranes or wall members in the liquid separating unit 35 may comprise sheets of closely woven material, such as glass or the like, for example, to provide a number of porous walls having capillary passages. When the liquid forming the continuous phase of the mixture is water or an aqueous solution, the porous sheets are formed of material which is hydrophilic and preferentially water wetted. Sheets 40 formed of glass cloth and the like are preferentially water wetted and, upon once being wetted by water, prevent flow therethrough of another liquid immiscible therewith. Conversely, when a hydrocarbon liquid forms the continuous phase of the mixture, the sheets employed are preferentially oil wetted and hydrophobic. When the sheets are formed of woven glass cloth and the like, such sheets may be rendered hydrophobic or water repellant by treating the material with silicones or a composition comprising an organo-silicon halide, as explained above, or in any other suitable manner well known in the art. When heat curing silicones are employed to render sheets of closely woven glass cloth water repellant, the surfaces produced on the sheets are hard and insoluble in hydrocarbon liquids.

Let us suppose that the sheets 40 are rendered hydrophobic and water repellant so that the capillary passages are readily wetted by a hydrocarbon liquid. In such case the hydrocarbon liquid forming the continuous phase is in intimate contact with the walls of each capillary passage in the sheets 40 and the surface immediately surrounding its inlet or entrance opening. There is an interfacial surface between such hydrocarbon liquid and the dispersed material, such as water, for example, which prevents the water touching the sheets because of the hydrocarbon liquid wetting the latter. Any pressure, however slight, will tend to bulge the hydrocarbon liquid-water interface into the capillary entrance. The extent to which the hydrocarbon liquid-water interface bulges is opposed or resisted by a force at the interface of the two liquids which is dependent upon and developed by the interfacial tension of the liquids.

The resisting force which is developed by the interfacial tension at the inlet of each capillary passage is dependent upon the perimeter of the passage at its inlet. A critical or "rupture pressure" is reached when the pressure differential across the sheets 40 increases to cause such bulging and distension of the interfacial surface, at the points of yield at the inlet of the capillary passage, that the interfacial surface becomes substantially parallel to the axis of the capillary passage at which time the water or liquid normally held back will begin to flow through the capillary passage.

So long as the pressure differential across the sheets does not exceed a predetermined maximum value, which has just been referred to as the "rupture pressure," the interface between the immiscible liquids at the inlets of the capillary passages will not be ruptured and the hydrocarbon liquid in the passages will not be displaced by water. The "rupture pressure" is dependent upon several factors including the interfacial tension of the liquids and the maximum size capillary passage. The "rupture pressure" increases for liquids having a higher interfacial tension value; and is inversely proportional to pore size and decreases with increase in the maximum size capillary passage.

The apparatus is positioned as shown in Fig. 1 when the specific gravity of the liquid forming the dispersed phase is greater than that of the liquid forming the continuous phase. In such case the fine particles of the heavier dispersed material coalesce at the sheets 40 to form larger particles or coalesced bodies of liquid which fall by gravity to the bottom of chamber 34 and into the collecting vessel 59. By providing a number of elongated slots 46 in end to end relation about the periphery of each spacer element 39, the downward movement of the coalesced bodies of dispersed material by difference in specific weight is facilitated.

Similarly, the coalesced bodies of dispersed material formed at the mat 30 and entrained in the liquid passing through the sleeve 33 settle and fall through the lighter continuous phase, by difference in specific weight, from the upper part of chamber 34 to the bottom part thereof. The sleeve 33 is preferably of such length and diameter that the average size drops or coalesced bodies of the dispersed phase will fall through the vertical height of sleeve 33 during movement of the mixture from one end to the opposite end of the sleeve.

Thus, even when the drops or coalesced bodies of the dispersed phase enter the extreme upper part of the sleeve 33 from the annular space 62, such coalesced bodies of average size entrained in the liquid passing toward the separating unit 35 will fall or settle at such a rate through the lighter constituent of the mixture that a large fraction of the coalesced bodies pass from the sleeve 33 at a region closely adjacent to the bottom part thereof. Such coalesced bodies of dispersed material continue to fall through the lighter constituent of the mixture after being discharged from the sleeve 33 and pass into the vessel 59 in which the coalesced bodies are collected.

By arranging the sleeve 33 within the hollow member 25 to cause the mixture to reverse its direction of flow at the closed end 26, a horizontally extending path of flow is provided for the mixture in which minimum turbulent movement of the mixture takes place. With minimum turbulent movement of liquid in the sleeve 33, effective separation of the coalesced bodies of dispersed material by difference in specific gravity is promoted. In this way a large fraction of the coalesced bodies of dispersed material formed at the mat 30 settle and fall in the sleeve 33 and pass directly into the collecting vessel 59, without contacting or acting against the porous sheets 40 of the liquid separating unit 35. This substantially reduces the work imposed upon the separating unit 35 to effect coalescing or agglomerating of the fine liquid particles forming the dispersed phase, thereby permitting the separating unit 35 to operate efficiently in effecting phase separation of the immiscible liquids.

The initial coalescing of the fine liquid particles forming the dispersed phase is effected at the mat 30, as previously explained. The final or residual coalescing of the dispersed phase is accomplished in the separating unit 35 at the surfaces of the porous sheets 40. The porous sheets 40 hold back the drops of liquid particles of the dispersed material which are of less than average size and also the drops of average size which are stirred up by eddy currents and do not settle immediately to the bottom of the chamber 34 upon passing from the sleeve 33. The liquid particles of the dispersed phase, which are of less than average size and do not settle and fall into the bottom part of the sleeve 33, pass through the chamber 34 into the inlet compartments 45 of the liquid separating unit 35.

It will be seen that an aperture 64 is provided in flange 27 in the lower or bottom part of the annular space 62. The bottom part of the space 62 overlies the bottom part of the mat 30. When the dispersed phase is the heavier constituent of the mixture, it has been found that the coalesced liquid bodies of the dispersed phase tend to collect in the bottom part of the space 62 above the mat 30. Since partial segregation or stratification of such dispersed material is effected in the space 62, the aperture 64 is provided whereby such coalesced liquid can pass from space 62 directly into the larger end of chamber 34 at the region of the collecting vessel 59 and settle in the latter. However, the aperture 64 is relatively small and liquid flows therethrough at a relatively slow rate while the bulk of the mixture flows in space 62 toward the closed end wall 26 of the hollow member 25.

In many instances coalesced liquid bodies or slugs of the dispersed phase are present in the mixture introduced into the inlet space 28. To permit such coalesced bodies of dispersed material to collect immediately, the vessel 58 is provided at the bottom part of the inlet space 28. The coalesced bodies of dispersed material, when the dispersed liquid phase forms the heavier constituent of the mixture, settle and fall into the vessel 58 and collect therein. The coalesced bodies of dispersed material collect in the vessels 58 and 59 and displace the lighter liquid forming the continuous phase of the mixture, and such coalesced liquid may be withdrawn from the apparatus 10 from time to time by removing the drain plugs 60 and 61, respectively.

When the liquid forming the dispersed phase is the lighter constituent of the mixture, the apparatus 10 may be employed equally well in such cases by simply connecting it in place in an inverted position from that shown in Fig. 1. In such case the drain plugs 60 and 61 are removed when the apparatus is initially placed in operation to vent air trapped in the inlet space 28 and chamber 34, and the opening 64 serves as a vent for air trapped in the annular space 62. During operation, the entire shell 11 including the vessels 58 and 59 is filled with liquid. When the apparatus 10 is being operated in its inverted position the outlet 54 is preferably closed and the liquid forming the continuous phase is discharged through a conduit connected to the outlet 56, so that such liquid will fill the chamber 53, manifold 51 and the compartments 44 of the separating unit.

The coalesced bodies of the lighter dispersed phase entering sleeve 33 rise therein during flow of the mixture toward the liquid separating unit 35. As previously described, the length and diameter of the sleeve 33 are preferably such that the drops or coalesced liquid bodies of average size can rise through a distance approximately equal to the diameter of the sleeve during the interval of time in which such drops move from the inlet end to the discharge end of the sleeve 33. A substantial fraction of the coalesced liquid bodies pass from the sleeve 33 at the extreme upper part thereof and continue to rise into the collecting vessel 59 without contacting or acting against the sheets 40 of the liquid separating unit.

The drops of dispersed material of less than average size which do not rise at the same rate as the average size drops, together with the coalesced liquid bodies of average size which are stirred up due to eddy currents and do not rise in chamber 34, pass into the liquid separating unit 35. Such coalesced liquid bodies passing into the liquid separating unit coalesce and agglomerate at the surfaces of the sheets 40, and, due to difference in specific gravity, rise through the heavier liquid forming the continuous phase. Such coalesced bodies of the dispersed material also find their way into the collecting vessel 59. The coalesced liquid collected in vessels 58 and 59 displaces liquid forming the continuous phase and may be withdrawn from the apparatus 10 from time to time in any suitable manner, as by syphon action, for example.

When operated in its inverted position the dispersed material collecting and stratifying in the upper part of space 62 can pass through the aperture 64 directly into the enlarged end of chamber 34. While some liquid can pass from the space 62 through the aperture 63 when the apparatus 10 is inverted and the dispersed phase forms the lighter constituent of the mixture, liquid flows at a relatively slow rate through such aperture since the bulk of the mixture in space 62 flows toward the closed end 26 of hollow member 25, as previously explained.

If desired, provision may be made for automatically and continuously removing from the apparatus 10 the coalesced liquid which collects in the vessels 58 and 59. To effect such automatic and continuous removal of the coalesced liquid, each collecting vessel may be formed with a narrow reduced cylindrical part 66 which extends downwardly from the lower end thereof, as shown in Fig. 6. The part 66 at its lower end is formed with an internal shoulder 67 at the bottom side of which is disposed a resilient sealing gasket 68 against which in turn snugly fits a flange 69 formed at the bottom lower end of a porous member 70. The porous member 70 extends upwardly within the cylindrical part 66 and the upper closed end is at approximately the same level as a removable priming plug 71 formed at the side of the cylindrical part 66.

The extreme lower end of the cylindrical part 66 is internally threaded to receive a tightening cap 72 which bears against the flange 69, and a suitable resilient sealing gasket 73 is provided between these parts. A hollow tube 74, which is fixed at its lower end to the cap 72 at a central opening in the latter, extends upwardly within porous member 70 and terminates at a region adjacent to the closed end thereof. A bottom cover plate 74a is threadedly secured to the bottom of the part 66 and formed with a threaded opening to which a drain conduit 75 is removably secured.

The porous member 70 may be formed of ceramic material which is inherently hydrophilic and preferentially water wetted. Such a porous member is suitable for automatically removing a dispersed water phase which collects in the vessels 58 and 59. When the ceramic material forming member 70 is once wetted and the pores thereof filled with water, the member 70 is then conditioned so that it will be pervious to the dispersed water phase and impervious to the liquid forming the continuous phase and immiscible therewith.

To facilitate such conditioning of the member 70 for automatically removing a dispersed water phase from the apparatus 10, the priming plug 71 is provided so that the part 66 may be filled with water so as to completely envelop the hollow member 70. The water introduced into the part 66 will pass through the capillary passages of the member 70, and, when the liquid level builds up within the member 70 to the upper end of the hollow tube 74, liquid will overflow through the tube. By providing the tube 74 substantially the entire surface of member 70 will always be maintained in a wetted state and there will be no danger of the pores losing their water filling by evaporation. While the water within member 70 does not contact the extreme top inner surface thereof, the pores in member 70 above the liquid level therein will also remain filled with liquid as a result of water working upwardly through the wall of member 70 by capillary attraction or wick action.

After the porous member 70 is conditioned for use by filling the pores thereof with water, the dispersed water phase collecting in the vessel 59 and passing therefrom into the cylindrical part 66 can pass through the member 70 into the interior thereof. Since the pores of member 70 are filled with water, the liquid forming the continuous phase and immiscible with water will not normally pass therethrough. So long as the pressure differential across the wall of member 70 does not exceed the "rupture pressure," as explained above, the interface between the water in the pores of member 70 and the liquid forming the continuous phase will not be ruptured and the water filling the pores will not be displaced by the liquid forming the continuous phase.

Hence, when the dispersed water phase collects in the vessel 59 and passes into the reduced cylindrical part 66, such water is automatically discharged from the apparatus 10 due to the pressure differential produced across the wall of the porous member 70.

When the dispersed phase of the mixture is a hydrocarbon liquid, the porous member 70 of ceramic material can be rendered preferentially oil wetted or hydrophobic by treating the porous member with any well known water repellant material like those referred to above. In such case, conditioning of the porous member 70 by the priming plug 71 is not absolutely necessary although this may be done if desired. When the coalesced bodies of hydrocarbon liquid collect in the vessel 59 and pass therefrom into the cylindrical part 66, such coalesced liquid bodies can freely pass through the capillary passages of the hydrophobic wall member. Since the pores of the member 70 are filled with the hydrocarbon liquid, the liquid forming the continuous phase and immiscible therewith, such as water, for example, will not normally pass therethrough so long as the pressure differential across the porous wall does not exceed the "rupture pressure," as previously explained.

When the dispersed material forms the lighter constituent of the mixture and the apparatus is operated in an inverted position from that shown in Fig. 1, the overflow tube 74 is not necessary within the porous member 70 since such porous member will always remain filled with liquid forming the dispersed phase when such liquid is being automatically discharged from the apparatus. It is to be understood that provision may be made for automatically discharging the dispersed liquid from both of the vessels 58 and 59 or either vessel alone.

It will now be understood that apparatus has been provided for treating emulsions and other mixtures of immiscible liquids for removing from a continuous phase another liquid immiscible therewith. The apparatus 10 is extremely compact and efficient in operation, the liquid separating unit 35 presenting to the mixture a large overall area of porous wall surfaces which occupies a minimum amount of space. For example, a particular installation generally like that illustrated and described is capable of treating 1000 gallons of gasoline per hour and effectively removing a dispersed water phase therefrom. The overall length of such apparatus is about 32 inches, the diameter of the shell 11 is about 8 inches and the overall height including the collecting vessels 58 and 59 is about 15 inches.

The apparatus 10 is so constructed and arranged that the liquid separating unit 35 may be removed for cleaning and inspection without disturbing the outlet connection 54. When it is desired to remove the separating unit 35 from the shell 11, the end plate 20 is removed after which the enlarged plate 36 is disconnected from the flanged end of the central section 12. The separating unit 35 can thus be removed from the end of the casing through the end section 15 as a single element or member. Likewise, when it is desired to inspect the coalescing and filtering unit 22, the end section 14 may be disconnected and removed without disturbing the inlet connection at 24. The end section 14 of the shell 11 is of such length that when it is disconnected from the central section 12, a major part of the hollow member 25 is accessible so that the mat 30 can readily be replaced with a fresh mat or body of porous material when this becomes necessary.

The liquid separating unit 35 is a rigid and compact structure and of such construction that the sheets 40 are effectively held between the spacer elements 38 and 39. Thus, by providing apertured bosses 47 for the spacer elements 38 which are slotted at 48 intermediate the faces thereof, the sheets are acted upon by parts of the spacer elements 38 which are adjacent to and in alignment with the apertured bosses 49 of the spacer elements 39. In this way a liquid tight seal is insured at the regions the continuous liquid phase leaves the compartments 44 and passes into the apertures in bosses 49 which, as explained above, are in alignment with the apertured bosses 47 and form the manifold 51.

In each application or use of the apparatus 10 just described porous sheets 40 are preferably employed in the liquid separating unit 35 which are formed with capillary passages of maximum size to obtain optimum flow therethrough of the liquid forming the continuous phase of the mixture of immiscible liquids. This maximum size of the capillary passages is dependent upon a number of factors, as previously explained, which includes the interfacial tension of the immiscible liquids and the pressure differential adapted to be produced across the porous sheets. The pressure differential adapted to be produced across the porous sheets will always be in a pressure range below and approaching the "rupture pressure," as previously explained, so that the only liquid passing through the capillary passages will be the liquid to which the porous sheets are pervious.

While a single embodiment of the invention has been shown and described, it will be obvious to those skilled in the art that various changes and modifications may be made without departing from the true spirit and scope of the invention, as pointed out in the following claims.

What is claimed is:

1. In the art of separating a mixture of liquids in which a first liquid is present in fine particles in a second liquid immiscible therewith, the improvement which comprises the steps of passing the mixture through a body of porous material to effect mechanical coalescing of the particles so as to form coalesced bodies of the first liquid, thereafter forcing the mixture against a porous wall member which is impervious to the first liquid and pervious to the second liquid so as to cause flow of the second liquid through such wall member and effect final or residual coalescing of the particles at such member to form coalesced bodies of the first liquid, said liquids being separated by difference in specific weight as the coalesced bodies of the first liquid are held back by the porous wall member, said improvement further including the step of flowing the mixture from the body of porous material to the wall member in an elongated path of flow removed from proximity to the porous wall member and from which the coalesced bodies of the first liquid may separate by gravity while moving in the general direction of flow of the mixture so that at least some of the coalesced bodies of the first liquid formed at the body of porous material avoid acting against the porous wall member.

2. In the art of separating from a first liquid forming a heavier continuous phase of an emulsion a lighter second liquid forming a dispersed phase therein, the improvement which comprises the steps of passing a mixture of immiscible liquids forming such emulsion through a body of porous material to effect mechanical coalescing of the dispersed phase so as to form coalesced bodies of the second liquid, thereafter forcing the mixture against a porous wall member which is impervious to the second liquid and pervious to the first liquid so as to cause flow of the first liquid through such wall member and effect final or residual coalescing of the dispersed phase at such member to form coalesced bodies of the second liquid, collecting at an upper level of the mixture flowing from the body of porous material to said wall member the lighter coalesced bodies of the second liquid rising through the mixture, and withdrawing the coalesced second liquid collecting at the upper level of the mixture, said improvement further including the step of flowing the mixture from the body of porous material to the porous wall member in an elongated path of flow out of proximity with the wall member and in which rise of the coalesced bodies is promoted in a path generally the same as that of the mixture so that at least some of the coalesced bodies of the second liquid formed at the body of porous material pass to said upper level of the mixture and avoid acting against said porous wall member.

3. In the art of separating from a first liquid forming a lighter continuous phase of an emulsion a heavier second liquid forming a dispersed phase therein, the improvement which comprises passing the mixture of immiscible liquids forming such emulsion through a body of porous material to effect mechanical coalescing of the dispersed phase so as to form coalesced bodies of the second liquid, thereafter forcing the mixture against a porous wall member which is impervious to the second liquid and pervious to the first liquid so as to cause flow of the first liquid through such wall member and effect final or residual coalescing of the dispersed phase at such member to form coalesced bodies of the second liquid, collecting at a lower level of the mixture flowing from the body of porous material to said wall member the heavier coalesced bodies of the second liquid falling through the mixture, and withdrawing the coalesced second liquid collecting at the lower level of the mixture, said improvement further including the step of flowing the mixture from the body of the porous material to the porous wall member in an elongated path of flow out of proximity with the wall member and in which settling or falling of the coalesced bodies is promoted by gravity in a path generally the same as that of the mixture so that at least some of the coalesced bodies of the second liquid formed at the body of porous material pass to said lower level of the mixture and avoid acting against the porous wall member.

4. Apparatus for coalescing the dispersed phase of an emulsion comprising a horizontally disposed elongated outer shell and a horizontally extending inner annular-shaped hollow member therein having a closed end adjacent to and spaced from an end wall of said shell and cooperating with the latter at its opposite end to form a space which extends about the side and closed end of said hollow member, said shell having an inlet communicating with said space for introducing an emulsion therein under pressure, said hollow member having a perforate section which extends from a region adjacent to the closed end thereof toward its opposite end, means including a mat of loosely packed fibers disposed about and overlying the perforate section of said hollow member and through which the emulsion is adapted to pass from said space to the interior of said hollow member to effect coalescing of the dispersed phase, and a hollow open-ended sleeve coaxially disposed within said member and spaced therefrom to form an annular passage therebetween, said sleeve having one end adjacent to and spaced from the closed end of said member, and means communicating with the opposite end of said sleeve for withdrawing liquid therefrom.

5. Apparatus for treating a mixture of immiscible liquids comprising a shell including a central section and first and second end sections removably connected thereto, said first end section being cup-shaped and having a closed end thereof forming an end of the shell, said second section having a removable end plate forming the opposite end of the shell, said central section having a pair of spaced apart inwardly extending flanges, an open-ended sleeve disposed within said first end section which is secured at one end thereof to one of said flanges, said sleeve communicating with said central section and forming therewith a chamber, a hollow annular-shaped member disposed between the sleeve and first end section, said hollow member having an open end thereof secured to said one flange and an opposite closed end thereof spaced from and closely adjacent to an open end of said sleeve, said hollow member having a perforate section, a mat of loosely packed fibers disposed about and overlying said perforate section, said hollow member cooperating with said shell to form an inlet space for the mixture of immiscible liquids adapted to be treated, said shell having an inlet for introducing the mixture to said inlet space, a liquid separating unit disposed within said central section, said unit being removably secured to said other flange and insertable into position in said shell and removable therefrom through said second end section upon removal of said end plate associated therewith, said liquid separating unit including porous material forming a wall of said chamber which is pervious to the liquid forming the continuous phase of the mixture and impervious to the other liquid immiscible therewith, said second end section having an outlet for discharging the continuous phase from the shell, and means for withdrawing from said shell the other liquid which is adapted to be held back by the liquid separating unit.

6. Apparatus as set forth in claim 5 in which the inlet is provided in said central section and the outlet is provided in said second end section so that said first end section and said end plate may be removed without disturbing the connections adapted to be made at the inlet and outlet.

7. Apparatus as set forth in claim 5 in which said one flange is provided with an aperture for venting air into the central section from the space between said sleeve and said hollow member, and said central section and first end section are provided with openings having removable closure members therefor to vent air from said inlet space and said chamber.

8. In apparatus for separating a plurality of immiscible liquids having different specific gravities, the combination of structure providing a horizontally extending chamber divided into three sections, an inlet in one end section through which said liquids are introduced, an outlet in the other end section through which one of the liquids is delivered, a horizontally extending, perforated member forming a partition between said one end section and the center section, a fibrous membrane, means to fasten said membrane over the perforations of said member, a horizontally extending baffle in said center section adjacent said member to form a horizontal flow path for said liquids, a separating membrane, means to mount said separating membrane between said center section and said other end section, said separating membrane being pervious to one liquid and impervious to the other, and a sump in said center section to collect the one of said liquids which has passed through said fibrous membrane and is withheld by said separating membrane.

9. In apparatus for separating a mixture of a plurality of immiscible liquids having different specific gravities, structure providing a horizontally extending chamber having an inlet adjacent one end and an outlet adjacent the other end, a perforated partition in said structure adjacent said one end of said chamber and beyond said inlet, a fibrous coalescing membrane, means to mount said membrane to cover the perforations in said partition whereby the mixture flowing into said chamber must pass said membrane to coalesce one of the liquids of said mixture, a separating membrane pervious to the lighter liquid and impervious to the heavier liquid of said mixture, means to mount said separating membrane across said chamber adjacent said outlet, whereby liquid flowing from said coalescing membrane to said separating membrane must travel in an elongated horizontal path so that the majority of said heavier liquid may settle by gravity to the lower portion of said chamber prior to the time it reaches said separating membrane, and an outlet in the lower portion of said chamber for the heavier liquid which has settled out of said mixture.

10. In apparatus for separating a mixture of immiscible liquids having different specific gravities, the combination of structure forming a horizontally disposed chamber having an inlet adjacent one end and an outlet adjacent the other end whereby liquid flowing through said chamber must travel in an elongated horizontal path, a fibrous membrane, means to mount said membrane adjacent the inlet end of said chamber whereby all of the liquid must pass through it, a separating membrane impervious to one of the liquids and pervious to the other, means to mount said separating membrane adjacent the outlet of said chamber so that all of the liquid passing through the outlet must go through said separating membrane, the arrangement being such that the majority of the heavier liquid will settle to the bottom of the chamber as it moves horizontally through said chamber between said two membranes to thereby reduce the amount of separating that must be done by said separating membrane, and an outlet from said chamber between said membranes through which the liquid not passed by said separating membrane may be withdrawn.

JOHN WARREN ROBINSON.

REFERENCES CITED

The following references are of record in the file of this patent:

UNITED STATES PATENTS

| Number | Name | Date |
|---|---|---|
| 813,014 | Merrill | Feb. 20, 1906 |
| 1,194,949 | Burchenal | Aug. 15, 1916 |
| 1,227,999 | Dameron | May 29, 1917 |
| 1,242,784 | Dyer et al. | Oct. 9, 1917 |
| 1,331,732 | Wait | Feb. 24, 1920 |
| 1,494,677 | Feldmeier | May 20, 1924 |
| 1,663,322 | Tekavec | Mar. 20, 1928 |
| 1,787,577 | Hills | Jan. 6, 1931 |
| 2,186,501 | Seligman et al. | Jan. 9, 1940 |
| 2,359,386 | Reinsch | Oct. 3, 1944 |
| 2,390,628 | Van Winkle | Dec. 11, 1945 |
| 2,404,872 | Walker | July 30, 1946 |

FOREIGN PATENTS

| Number | Country | Date |
|---|---|---|
| 602,788 | France | Mar. 26, 1926 |